US010637665B1

(12) United States Patent
Sundaresan (10) Patent No.: US 10,637,665 B1
(45) Date of Patent: Apr. 28, 2020

(54) BLOCKCHAIN-BASED DIGITAL IDENTITY MANAGEMENT (DIM) SYSTEM

(71) Applicant: Workday, Inc., Pleasanton, CA (US)

(72) Inventor: Prakash Sundaresan, Redmond, WA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/662,417

(22) Filed: Jul. 28, 2017

Related U.S. Application Data

(60) Provisional application No. 62/368,875, filed on Jul. 29, 2016, provisional application No. 62/489,772, filed on Apr. 25, 2017.

(51) Int. Cl.
| | |
|---|---|
| *H04L 9/32* | (2006.01) |
| *H04L 29/06* | (2006.01) |
| *G06F 21/32* | (2013.01) |
| *G06F 21/57* | (2013.01) |
| *H04L 9/08* | (2006.01) |
| *H04L 9/06* | (2006.01) |
| *H04W 12/06* | (2009.01) |
| *H04W 12/12* | (2009.01) |
| *G06Q 20/40* | (2012.01) |

(52) U.S. Cl.
CPC ............ *H04L 9/3226* (2013.01); *G06F 21/32* (2013.01); *G06F 21/57* (2013.01); *G06Q 20/4014* (2013.01); *G06Q 20/4016* (2013.01); *H04L 9/0637* (2013.01); *H04L 9/0825* (2013.01); *H04L 9/0877* (2013.01); *H04L 9/0891* (2013.01); *H04L 9/3247* (2013.01); *H04L 9/3271* (2013.01); *H04L 63/102* (2013.01); *H04W 12/06* (2013.01); *H04W 12/12* (2013.01); *G06F 2221/2103* (2013.01); *H04L 2209/38* (2013.01)

(58) Field of Classification Search
CPC ... H04L 9/3247; H04L 9/3271; H04L 9/3213; H04L 63/0807; H04L 63/0823; G06F 2221/2103
See application file for complete search history.

(56) References Cited

U.S. PATENT DOCUMENTS

| | | | |
|---|---|---|---|
| 9,397,980 B1 * | 7/2016 | Chen | ...................... H04L 9/3263 |
| 2008/0010449 A1 | 1/2008 | Holtzman | |

(Continued)

FOREIGN PATENT DOCUMENTS

GB      2539430 A   * 12/2016    ........... G06Q 20/065

OTHER PUBLICATIONS

Andreas M. Antonopoulos, "Mastering Bitcoin Programming the Open Blockchain", Jun. 1, 2017, O'Reilly, 2nd Edition, Chapter 5 (Year: 2017).

(Continued)

*Primary Examiner* — Ellen Tran
(74) *Attorney, Agent, or Firm* — Van Pelt, Yi & James LLP (57) ABSTRACT

A method, software, and system for an Digital Identity Management (DIM) system is discussed.
The system facilitates the creation of a Public Key/Private Key pair based user credentials using the Trusted Execution Environment in mobile phones, and is protected by DIM app with the user's biometrics and/or a PIN code. Identity tokens representing identity attributes of the user are issued by Issuing Parties using Hardware Security Modules and stored in the DIM app on the mobile device.

17 Claims, 10 Drawing Sheets

(56) References Cited

U.S. PATENT DOCUMENTS

| | | |
|---|---|---|
| 2010/0138652 A1 | 6/2010 | Sela |
| 2016/0086175 A1 | 3/2016 | Finlow-Bates |
| 2016/0261411 A1 | 9/2016 | Yau |
| 2016/0275461 A1 | 9/2016 | Sprague |
| 2017/0147808 A1 | 5/2017 | Kravitz |
| 2017/0155513 A1* | 6/2017 | Acar .................. G06Q 20/3227 |
| 2017/0180128 A1 | 6/2017 | Lu |
| 2017/0222815 A1* | 8/2017 | Meriac .................. G06F 21/554 |
| 2017/0344988 A1 | 11/2017 | Cusden |
| 2017/0357966 A1* | 12/2017 | Chandrasekhar .. G06Q 20/3829 |
| 2018/0006826 A1* | 1/2018 | Smith .................. H04L 9/3268 |
| 2019/0266334 A1 | 8/2019 | Robison |

OTHER PUBLICATIONS

Biryukov et al., "Argon2: new generation of memory-hard functions for password hashing and other applications", 2016, IEEE, pp. 292-300 (Year: 2016).

* cited by examiner

BLOCKCHAIN-BASED DIGITAL IDENTITY MANAGEMENT (DIM) SYSTEM

CROSS-REFERENCE TO RELATED APPLICATIONS

This application claims priority for provisional application with application No. 62/368,875 filed Jul. 29, 2016 with the same inventors and titled "Trusted Key Blockchain-Based Identity Management System Towards a World of Strong Identity, Security, and Smart Contracts" and provisional patent with application No. 62/489,772 filed on Apr. 25, 2017, the complete disclosures of which, in their entireties, are hereby incorporated by reference.

BACKGROUND

Presently, solutions and systems for identity security are insufficient. Several examples of distinct and related problems that compromise security exist.

"For example, passwords are inherently insecure for multiple reasons. People use the same (or a few) passwords across multiple sites. Consequently, a compromise or hacking at one website with poor security practices leads to compromise of the user's accounts at other sites where the user has used the same password. Various websites offer username-password credentials for sale.

Another example is identity theft resulting from information that has been obtained by hacking or compromises in web sites. The identity theft results from leaked information such as SSN, date of birth, etc. that criminals use to open accounts and credit cards. Millions of consumers have been victims of identity theft.

Present solutions are inefficient or attempt to merely provide a patch or temporary solution. A need exists for a fundamental redesign of the identity system and software solutions.

SUMMARY OF THE INVENTION

In one aspect, the invention provides a method, software, and system for a digital identity management system. In one embodiment, the invention provides a unique and inventive solution of public/private key cryptography with cryptography-based Blockchains. In another embodiment, the Blockchains are immutable, massively replicated, highly available, and open. The invention facilitates interfacing with mobile phones with a Trusted Execution Environment to complete the digital identity management system solution.

The claimed subject matter depicts a platform for Digital Identity Management (DIM) with improved security over the prior art and includes the following:

The claimed subject matter facilitates securely creating user Credentials, a public-key and private-key pair by a Digital Identity Management application on an electronic device. If available, the Digital Identity Management application creates user Credentials by utilizing a trusted execution environment (TEE) of the electronic device, preventing the private-key from being extracted from the TEE. Also, the Digital Identity Management application protects access to the Private Key of the user Credential by requiring a user biometric, and only after unlocking the digital identity application is the Private Key available for executing cryptographic operations. Furthermore, the digital identity management application protects access to the Private Key of the user Credential by requiring an electronic device local PIN code, and only after unlocking the digital identity application is the Private Key available for executing cryptographic operations. The cryptographic operations may include encryption and/or decryption operations.

In another aspect, the digital identity management application protects access to the Private Key of the user Credential by requiring an user biometric and an electronic device local PIN code, and only after unlocking the digital identity application is the Private Key available for executing cryptographic operations.

In another aspect, the claimed subject matter supports mapping and multiple configurations With a 1-1 mapping from the user Credentials to the electronic device is recorded in the Digital Identity Management system, wherein, provided the Public KeyPublic Key of the user Credentials, the Digital Identity Management system uniquely identifies and delivers notifications and challenge-response messages to the electronic device.

For example, a first configuration, a public configuration, for creating and revoking of the user Credentials, represented by the Public Key, are registered on a public Blockchain to facilitate a third party checking the Blockchain for verification of the validity of the user Credentials. In a second configuration, a permissioned configuration, for creating and revoking of the user Credentials, represented by the Public KeyPublic Key, are registered on a permissioned Blockchain or database to facilitate a permissioned party for checking the Blockchain or database to verify the validity of the user Credentials.

The preceding solutions enables and facilitates execution of the scenarios depicted in the following figures and specification below.

DETAILED DESCRIPTION OF THE INVENTION

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all the listed elements, and/or a combination of all the listed elements. Section divisions in the specification are for ease of review only and do not limit any combination of elements discussed.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

A user's identity is built step by step using a Digital Identity Management wallet application (the DIM app) on the user's mobile device, a back-end service (the DIM service) and a Blockchain. The first step is for the user to download and install the DIM app. Upon first use, the DIM app requires the user to register their biometrics (e.g. fingerprints) and/or a PIN code, which is required to subsequently unlock the DIM app for any use. Next, the DIM app generates a Public-Key Private-Key pair (the "Credentials") using the cryptographic processor on the device associated with the user, which serve as the foundation for the user's digital identity. In particular, the innovative system design provides the user with the ability to effectively sign transactions on a Blockchain with these Credentials. While the Public Key of the key-pair can be freely shared, the Private Key never leaves the cryptographic processor on the device it was created on. In one embodiment, a user may create as many sets of Credentials based on their preferences or system factors In order to further establish the user's identity, digital Identity Tokens are associated with the Public Key of the user's Credentials. In one embodiment, Identity Tokens can be obtained from any "Identity Authority". For example, an authority such as a DMV (Department of Motor Vehicles) may generate and sign Identity Tokens using an identity authority device (e.g. a DMV server), that reference the Public Key of the user's Credentials and securely attest to all the information in the user's physical driver's license (e.g. first name, last name, address, date of birth, id #, photo etc.). These Identity Tokens are digitally signed by the DMV using a signature Private Key of a key-pair (e.g. an identity authority signature key pair that includes an identity authority public key and an identity authority private key), the Public Key of which is registered with existing Internet Certificate Authority infrastructure, so any "Relying Party" can verify that such Identity Tokens were indeed issued by that DMV.

Identity Token={Credential Public Key, Identity Token Id, Expiry Date, Attributes} where
 Credential Public Key is the Public Key of the Credentials to which the Token is issued,
 Identity Token Id is a unique identifier within the domain of this Identity Authority
 Expiry Date is the date until which this Token is valid, and
 Attributes are the actual identity attributes being certified (e.g. Name, DoB, Address etc.)

The DMV may provide such Identity Tokens to the user, securely signed with the DMV's Private Key and then encrypted with the Public Key of the user's Credentials. When the user needs to "show" their driver's license to, or share any data fields within the driver's license with, a "Relying Party", they decrypt the data (with the Private Key of their Credentials) and then share it with such Relying Party. The Relying Party is able to conditionally verify that the Identity Tokens were issued by that Identity Authority (e.g. the DMV) by verifying with the Internet Certificate Authorities as to the ownership of the signature key-pair the Identity Token is signed with.

It is expected that the Identity Authority retains a copy of the issued Token in their private database. However, the system design does not require the Identity Token itself to be published anywhere else, and it particular on the Blockchain. Thus, the identity token and its identity attributes are unpublished on the blockchain. Not only does this design preserve the user's privacy, but it also reduces the dependency on the expensive compute and storage of the Blockchain.

In one embodiment, the identity system design has a feature that Relying Parties can choose whether and to what degree they choose to trust an Identity Authority. In our example, whether a Relying Party trusts the DMV to certify user attributes (such as date of birth) is up to the Relying Party. The system design is also conducive to "network of trust" approaches (in addition to "hierarchy of trust") in that any participant is able to issue Identity Tokens to any other party as long as they have a public-private key-pair.

Once the user has their DMV-issued Identity Tokens, they can then use these Tokens to, for example, open a bank account, and do so completely electronically, as the bank is able to utilize the DMV-issued Identity Tokens to meet their KYC ("Know Your Customer") requirements. At this point, the bank can also issue the user additional Identity Tokens, indicating, for example, when the user's relationship with the bank started, their credit rating etc. The user can in turn use these Identity Token to avail themselves of other services (e.g. obtain a credit card or loan).

Credential and Identity Token Management with Blockchain

So far, the system described has only used public-private key cryptography and secure processors. Where Blockchains come into the picture is in Credential and Identity Token management. In particular, the Blockchain is used to maintain the Credential Revocation List (CRL) and Identity Token Revocation list (ITRL). The system uses the immutable, massively replicated, highly available properties of Blockchains, as well as the ability to run code (Blockchain "smart contracts") triggered by specific events, including the availability of signatures of appropriate Private Keys, for this purpose.

The DIM system provides pre-built CRL and ITRL Blockchain contracts. Users and Identity Authorities would register themselves into these respective contracts when they set up their Credentials.

Credential Revocation List (CRL):

A user may set up a way to revoke a set of Credentials in advance by registering with the DIM CRL Blockchain contract. For instance, in the case where the user has multiple sets of Credentials (say, on multiple devices), the user may register with the CRL Blockchain contract that allows any one of the Credentials to revoke the other set of Credentials. If the user loses one of set of Credentials (e.g. their primary phone), they can then use the other set of Credentials (in this case, their secondary device) to invoke the CRL Blockchain contract to revoke the phone Credentials. Alternatively, the user could register with a Blockchain contract where, in order to revoke a set of Credentials, an enrolling agent (such as a Telco) has to sign with their set of keys. In this case, the enrolling agent would likely check ("proof) additional identifying information (including biometrics) of the user before signing the revocation transaction.

Psuedo Code for CRL Blockchain Contract:
Contract Credential_Revocation_List (input Data Mesg)
{
If Mesg::type=="Register" then
{
Add_to_Revokee_Table (PubKeyCaller, Mesg::Pub Key_Revoker)
}
Else if Mesg::type="Revoke" then
{
If PubKey Caller==Lookup_Revokee_Table(Mesg::Pubkey_Revokee) then Send_Revoke_Mesg (Mesg::Pub key_Revokee, "Credentials Revoked by PubKey_Caller")
}
}
Conceptually, this creates a Revokee table in the private data of the CRL Contract

| Revokee | Authorized Revoker |
|---|---|
| Pubkey_Revokee_1 | Pubkey_Revoker_1 |
| Pubkey_Revokee_2 | Pubkey_Revoker_2 |

In order to revoke the Credentials of the Revokee, the CRL contract needs to be called by a registered authorized Revoker for that Revokee. In this case, the CRL shall send a revocation message to the Revokee PubKey address.

Relying Parties, before accepting a set of Credentials, check the Blockchain for such messages from these well-known Revocation Contracts to ensure those Credentials have not been revoked. The immutable, massively distributed and always available property of Blockchains makes it a very suitable store for such a revocation store.

Identity Token Revocation List (ITRL):

Identity Tokens usually come with a built-in expiry date—Relying Parties can check if a token it is still valid in the token itself.

The Identity Authority issuing the token can also revoke it by sending a message to the Public Key of the Credentials to which the token was issued, with the Token Id being revoked. Again, Relying Parties check the Blockchain for Identity Token revocation transactions before accepting any Identity Tokens as valid.

Figure 1:
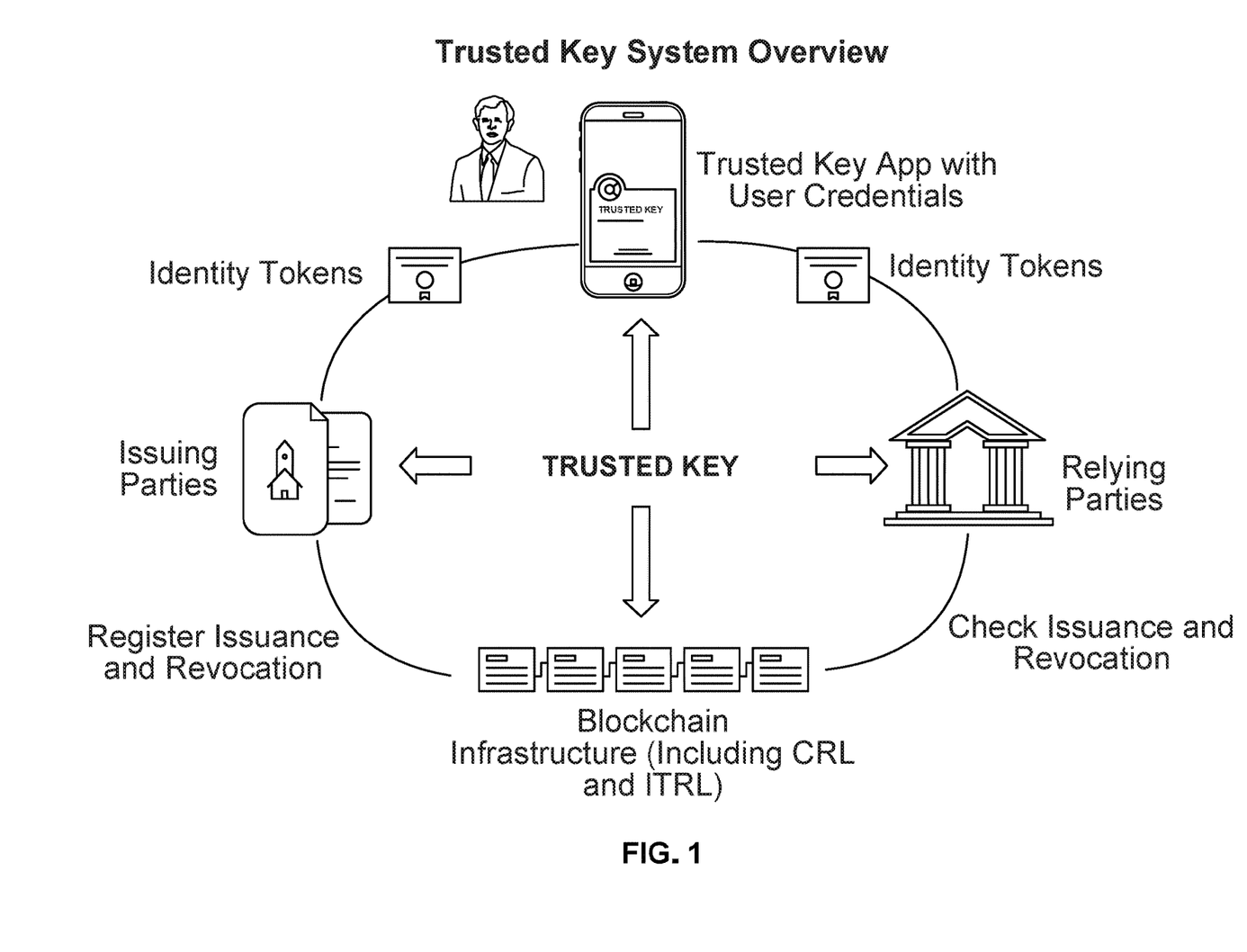
FIG. 1 is a system overview of one embodiment of the Digital Identity Management (DIM) Platform.
Figure 2:
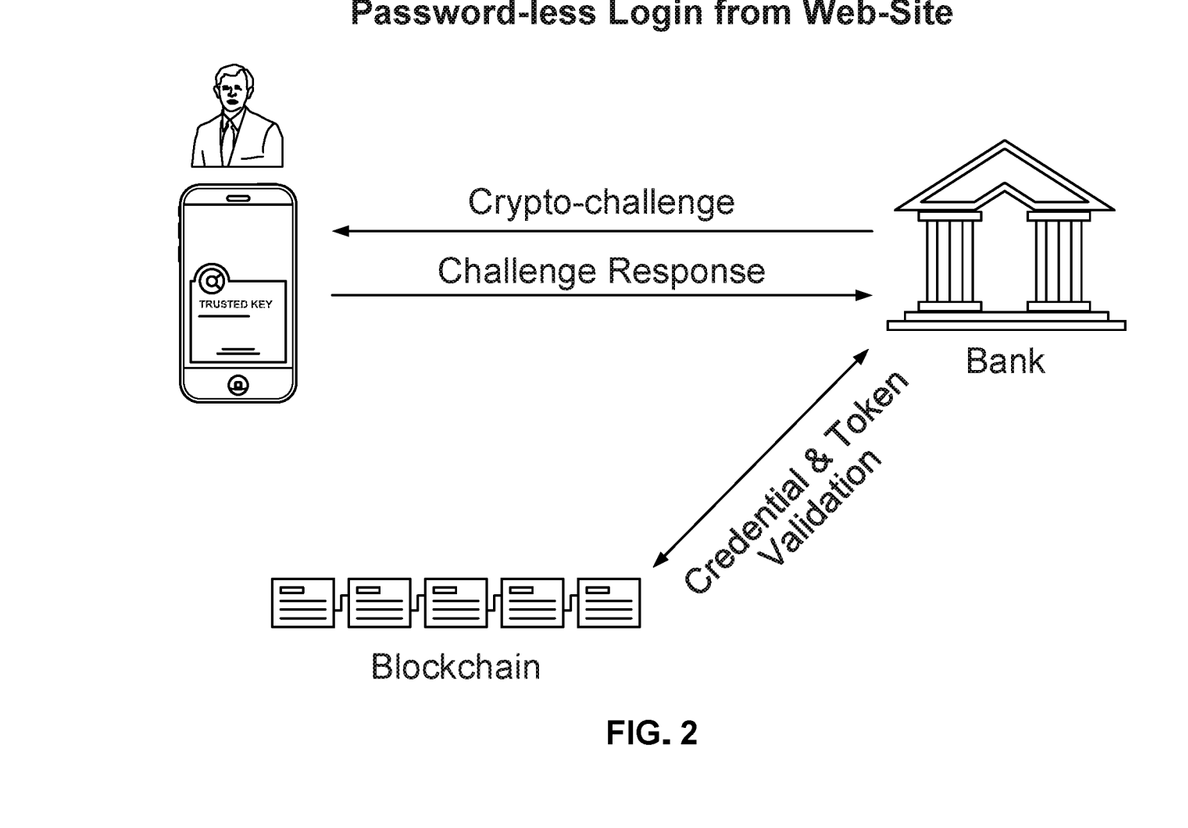
FIG. 2 depicts a method of one embodiment to support a login by a user without a password from a web site.
Figure 3:
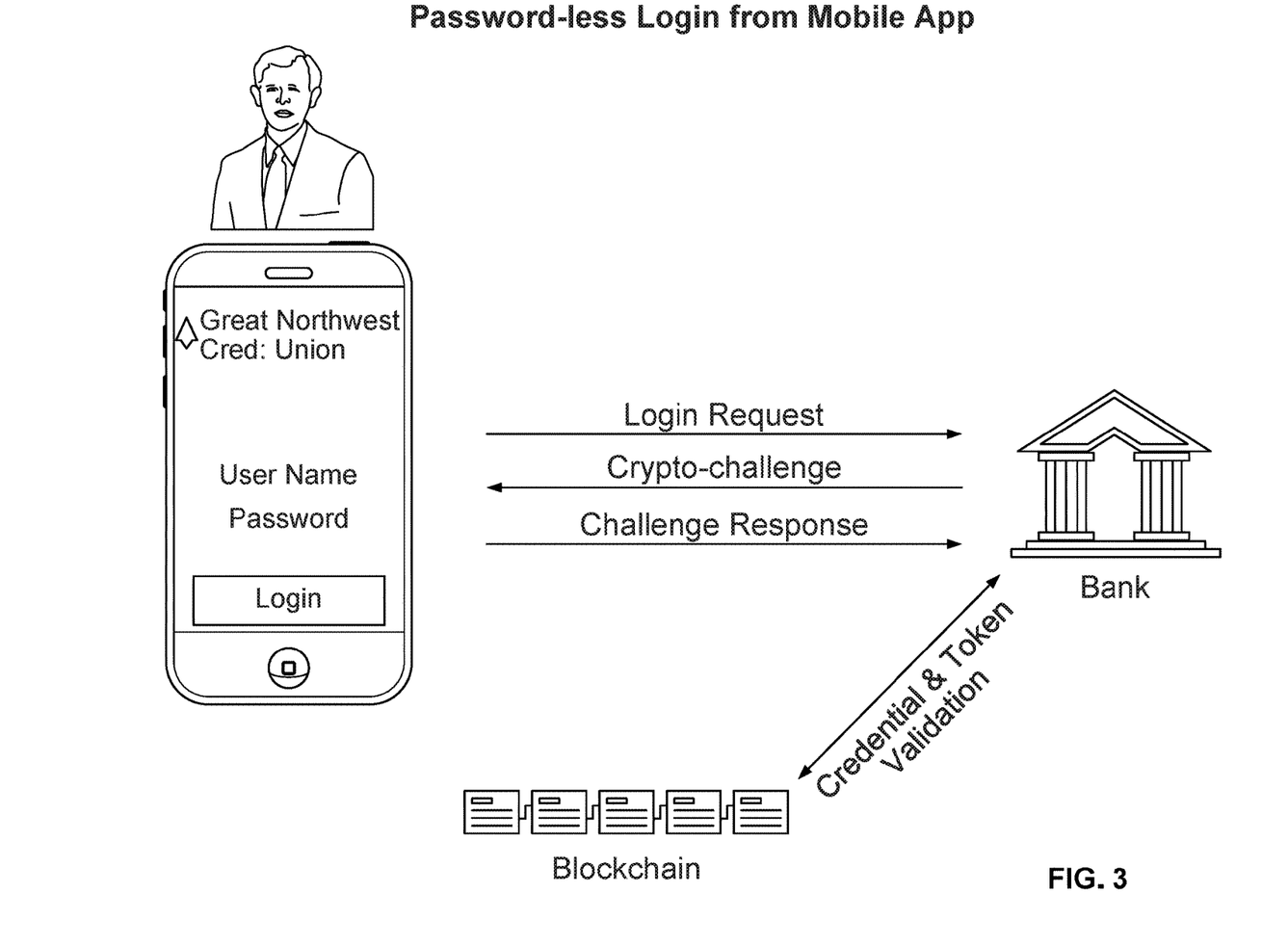
FIG. 3 depicts a method of one embodiment to support a login by a user without a password from a mobile app.

FIGS. 2 and 3 depict a method to support a login by a user without a password in according with an embodiment of the invention.

Scenario 1. Cryptographic Password-Less Login

When the user makes an authentication request (e.g. goes to sign up) for a new online service (a "Relying Party"), they share with the service the Public Key of their Credentials. The service then assigns the user a username in their system (e.g. a relying party device), but instead of requiring the user to set a password, it just records the Public Key of the user's Credentials. When the user needs to login, the service uses the DIM system (e.g. via the relying party device) to initiate cryptographic challenge-response mechanism to authenticate the user. The cryptographic challenge may include or be derived from a pseudorandom value. In some embodiments, the system (e.g. via the relying party device) generates a pseudorandom value (a "nonce"), performs a cryptographic operation (e.g. encrypts it) with the user's Public Key, sends it to the user's device and asks the user to perform a reverse cryptographic operation (e.g. decrypt) on the value and return it to prove they possess the corresponding Private Key.

The DIM app on the user's device receives the cryptographic challenge and asks the user to unlock the app by providing a biometric or a secure PIN, which is compared with their previously-registered biometrics (e.g. a previously registered fingerprint) and/or a previously registered secure PIN to use the Private Key to respond to the challenge. In some embodiments, once the user unlocks the DIM app, it uses the Private Key of the user's Credentials to un-encrypt the nonce and send the result of the reverse cryptographic operation back to respond to the cryptographic login challenge and conditionally authenticate the user.

This login mechanism works regardless of where the user is trying to login from—it could be any connected device or computer anywhere in the world. The cryptographic challenge is always sent to the user's device, and as long as the device is able to receive and respond to the challenge, the login process is able to complete successfully.

Figure 4:
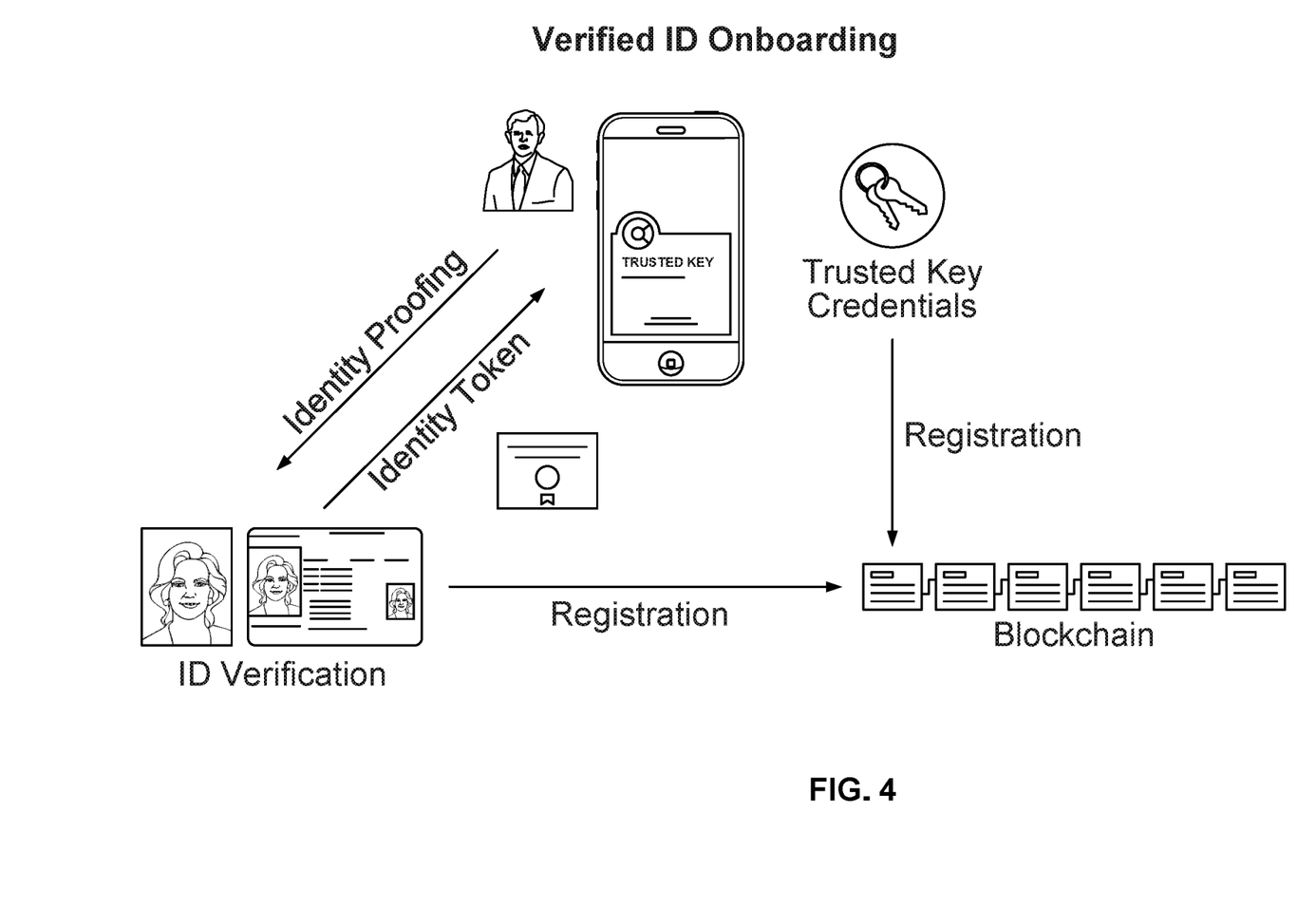
FIG. 4 is a method of one embodiment for a third-party verification of the user's identity and issuance of Identity Tokens.
Figure 5:
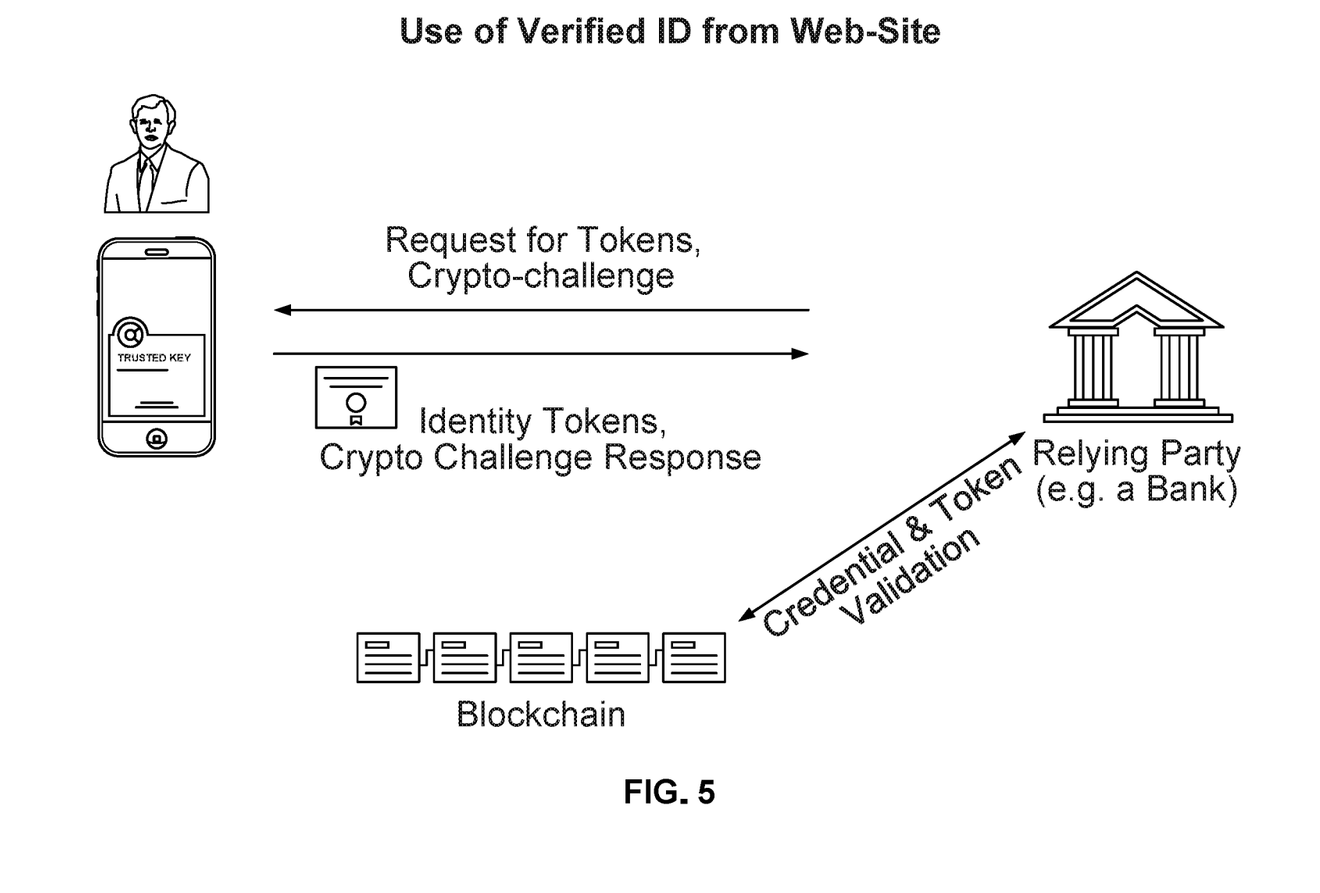
FIG. 5 is a method of one embodiment for a third-party verification of Credentials and Identity Tokens.

FIGS. 4 and 5 depicts a method of one embodiment for a verification of identity and use of such verified identity.

Scenario 2. Verified ID

In an increasing number of scenarios, it is crucial for a person's offline (or "legal") identity to be verified and associated with their online id. For example, an Uber driver, an AirBnB host or guest, members of peer-to-peer commerce or dating apps such as OfferUp and match.com are either required or encouraged to provide a verified legal ID to the site/app operator. This is currently done on a per-site basis and the mechanism typically involves the user uploading a photo of their government-issued ID (e.g. driver's license) as well as a picture/video of themselves. Each service then implements their verification in a site-specific way.

In the DIM system, a user is able to verify their legal ID once, create a cryptographic equivalent representation, and then re-use it across any number of such "Relying Parties". The DIM system uses online ID verification services to serve as "notarizing authority" who take on the task of "proofing" the user's legal identity. The notarizing authority checks the user's government issued ID (physically or electronically) and then issues a set of Identity Tokens to the user's Credentials (e.g. those created on their mobile phone). The user can then use these Identity Tokens with any service that requires them to produce a validated identity, thus removing the need for the user to validate their identity each time, and also the need for Relying Parties to do their own identity verification.

Figure 6:
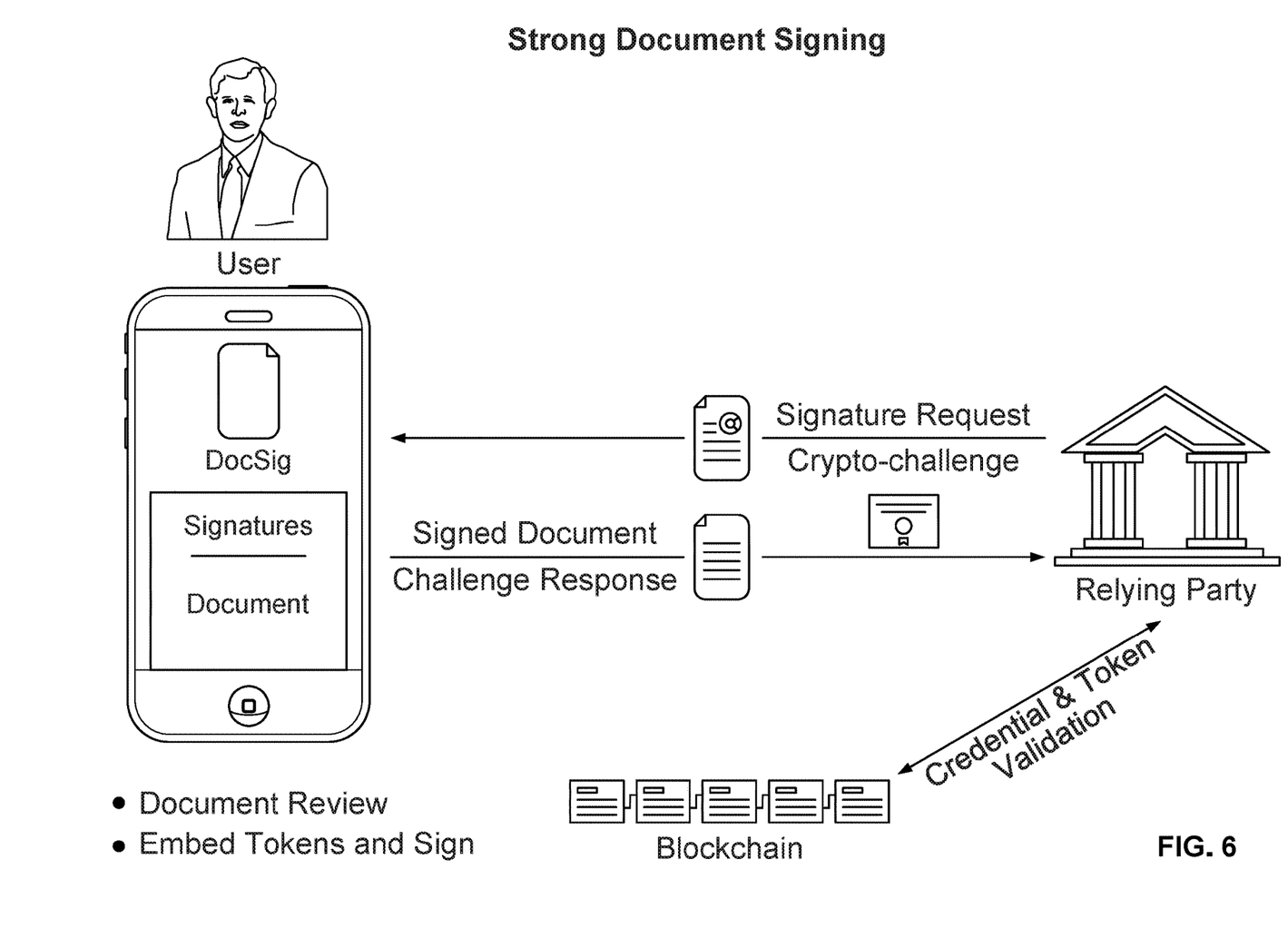
FIG. 6 depicts a method of one embodiment to digitally sign a document and attach Identity Tokens.

FIG. 6 depicts a method of one embodiment for strong digital signing of a document.

Scenario 3. Strong Digital Signing

Today, electronic document signing is available through a variety of vendors such as Docusign, Adobe, etc. While these systems are widely used (for example for real estate transactions), the level of assurance they provide as to the identity of the signatory is quite minimal. Typically, every user who needs to sign a document electronically receives a link via email and then clicks on the link to complete the signing. However, anyone who comes into possession of this link could sign on that signatory's behalf. Receivers of the signed document do not have any way to verify exactly who signed the document. While there is a provision for users to set up 2-factor authentication (e.g. receive a code on their phone via SMS and verify it), most users do not configure this facility.

With the DIM system of associating a verified identity to a Public-Private key-pair based Credentials, we can then utilize this to strongly sign documents. In such a scheme, the user with the verified Identity Tokens embeds those tokens into document and then cryptographically signs the document with the Private Key of their Credentials. A receiver of the signed document verifies the identity of the signatory by extracting the Identity Tokens from the document and checking that the Public Key referenced in the Identity Tokens corresponds to the Private Key used to sign the document. This system can be used to help establish that it was indeed the intended user who signed the document—just having a link to the document that needs signing is no longer be enough to (strongly) sign the document as only the intended signatory has the Identity Tokens and corresponding Private Key to be able to sign the document.

Figure 7:
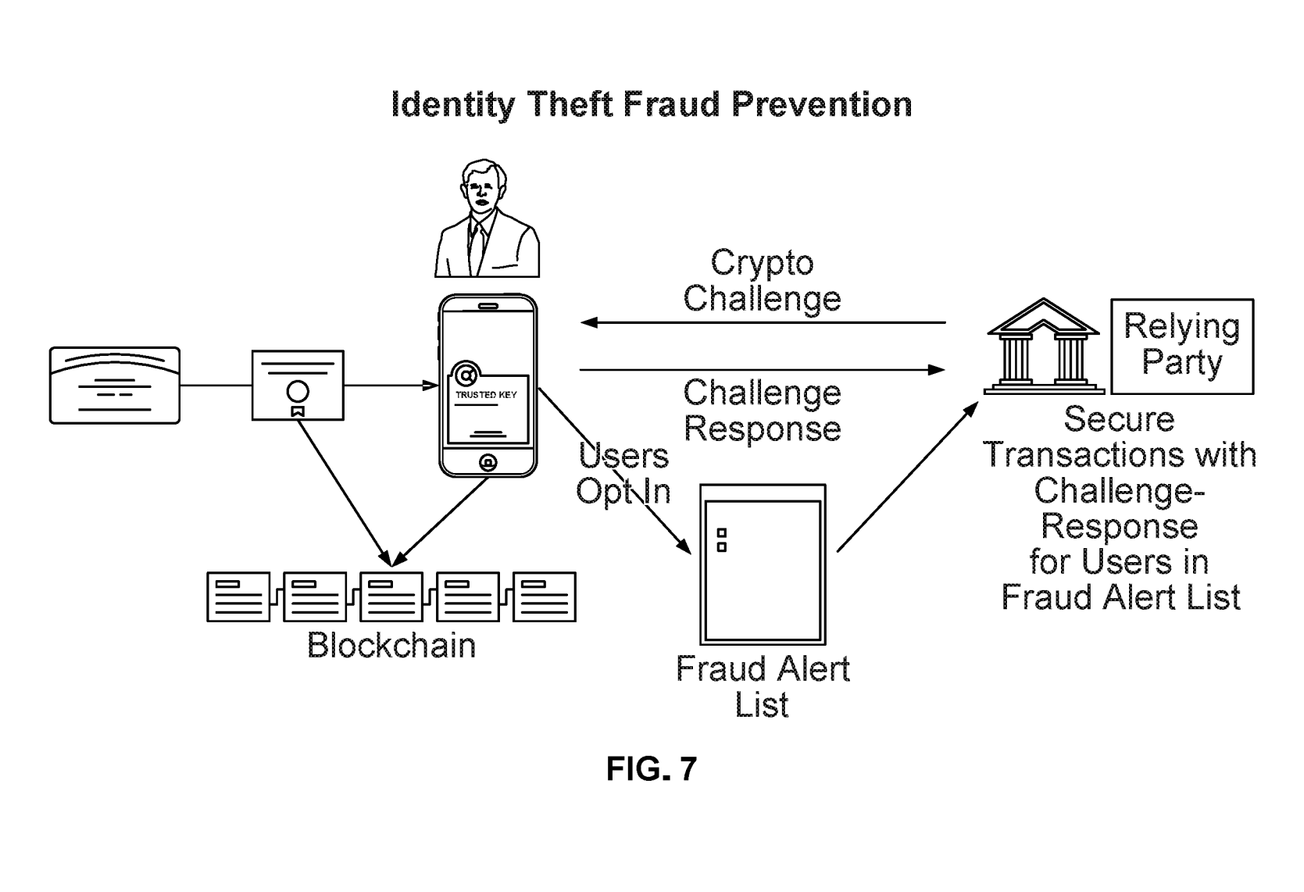
FIG. 7 depicts a method of one embodiment facilitate a protection of user identity against identity theft fraud.

FIG. 7 depicts a method of one embodiment to facilitate a protection of user identity.

Scenario 4. Identity Theft Fraud Prevention Via Fraud-Alert List

When a user suspects or knows that they are at risk of identity theft (for example due to a data breach), www.identitytheft.gov recommends placing oneself on a Fraud Alert List to "make it harder for someone to open new accounts in your name. When you have an alert on your report, a business must verify your identity before it issues new credit in your name."

A practical implementation of the Fraud Alert List would be one where the user uses their DIM Credentials to place a digitally signed record on a public list or database. Any business (e.g. a bank or credit card company) could check this list and for those users who have placed themselves on it, could insist that new credit applications must be digitally signed with the same Credentials, thereby preventing would-be identity-theft fraudsters from transacting (obtaining loans or filing tax returns) on the user's behalf.

Figure 8:
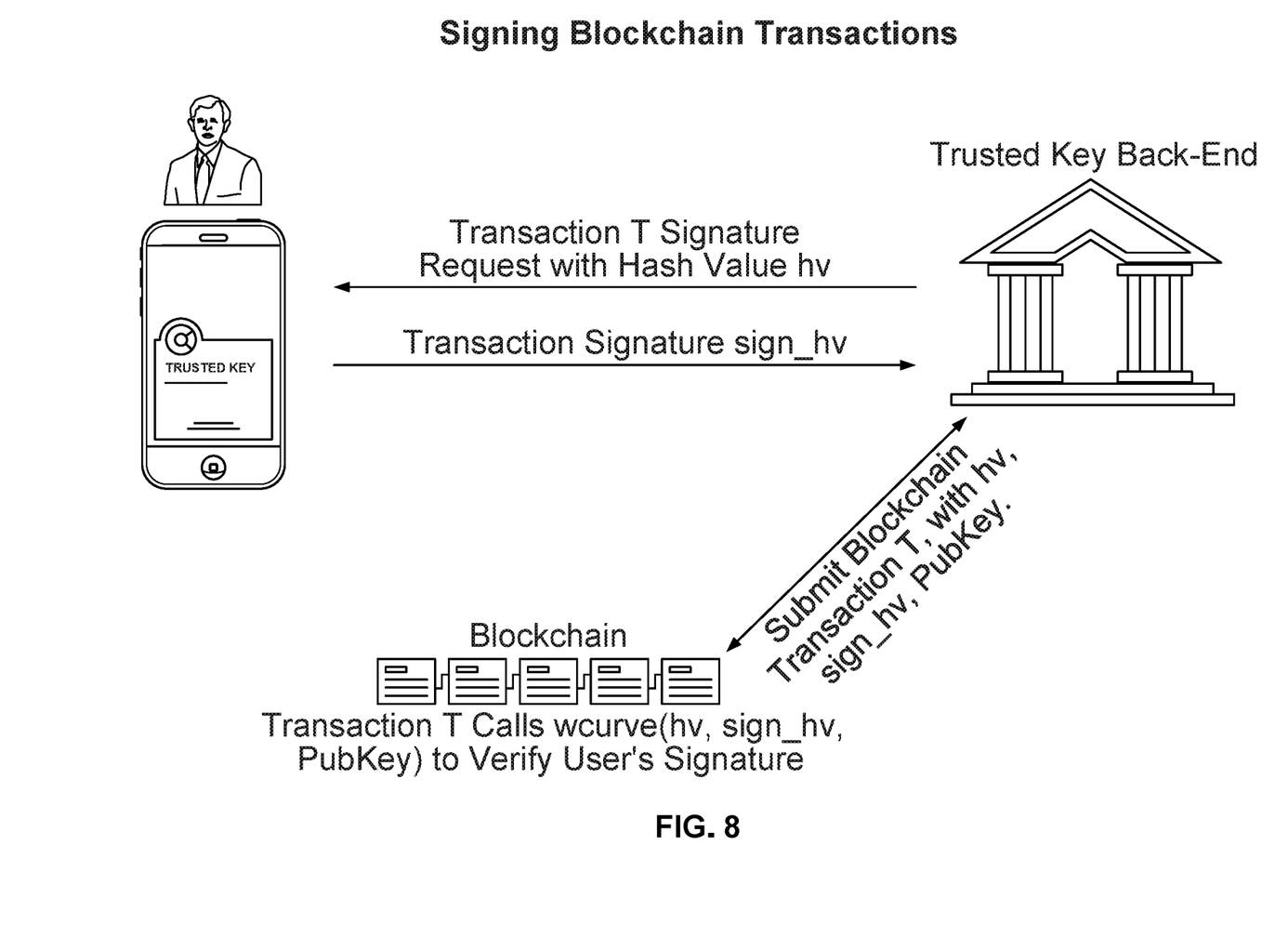
FIG. 8 depicts a method of one embodiment for a signing a Blockchain transaction directly from the cryptographic processor of the mobile phone.

FIG. 8 depicts a method of one embodiment for a workflow for a Blockchain transaction.

Scenario 5. Signing Blockchain Transactions

The DIM system enables users to effectively sign Blockchain transactions directly with their DIM Credentials. However, digital signatures on commonly used Blockchains (Bitcoin, Ethereum) are currently incompatible with the digital signatures generated by the cryptographic processors in common mobile phones (such as iPhones and Android phones). While this incompatibility could be solved by extracting the Private Key of the user's Credentials from the cryptographic processor and then generating a Blockchain-compatible signature in software. However, being able to extract the Private Key from the cryptographic processor would compromise security since adversaries could do so as well.

To solve this problem, DIM system implements a Blockchain contract wcurve (written in a Blockchain's native programming language) that verifies that a signature generated on a mobile device is indeed correct.

wcurve(hv, sign_hv, PubKey) returns TRUE if and only if sign hv is the signature of hv computed using the PriKey corresponding to the PubKey.

In this system, the user's Credentials can be used to sign Blockchain contracts (so-called "smart contracts") while at the same time providing proof of identity using the associated Identity Tokens. The digital signature is created directly from the cryptographic processor of the mobile device without extracting the Private Key. However, using the wcurve contract, any Blockchain contract can verify such a signature Such Blockchain contracts can make more efficient a number of processes where humans are involved in reading a piece of legal paper (an algorithm specification) and executing its provisions, such as wills, real-estate transactions, debt and stock agreements, voting etc.

Figure 9:
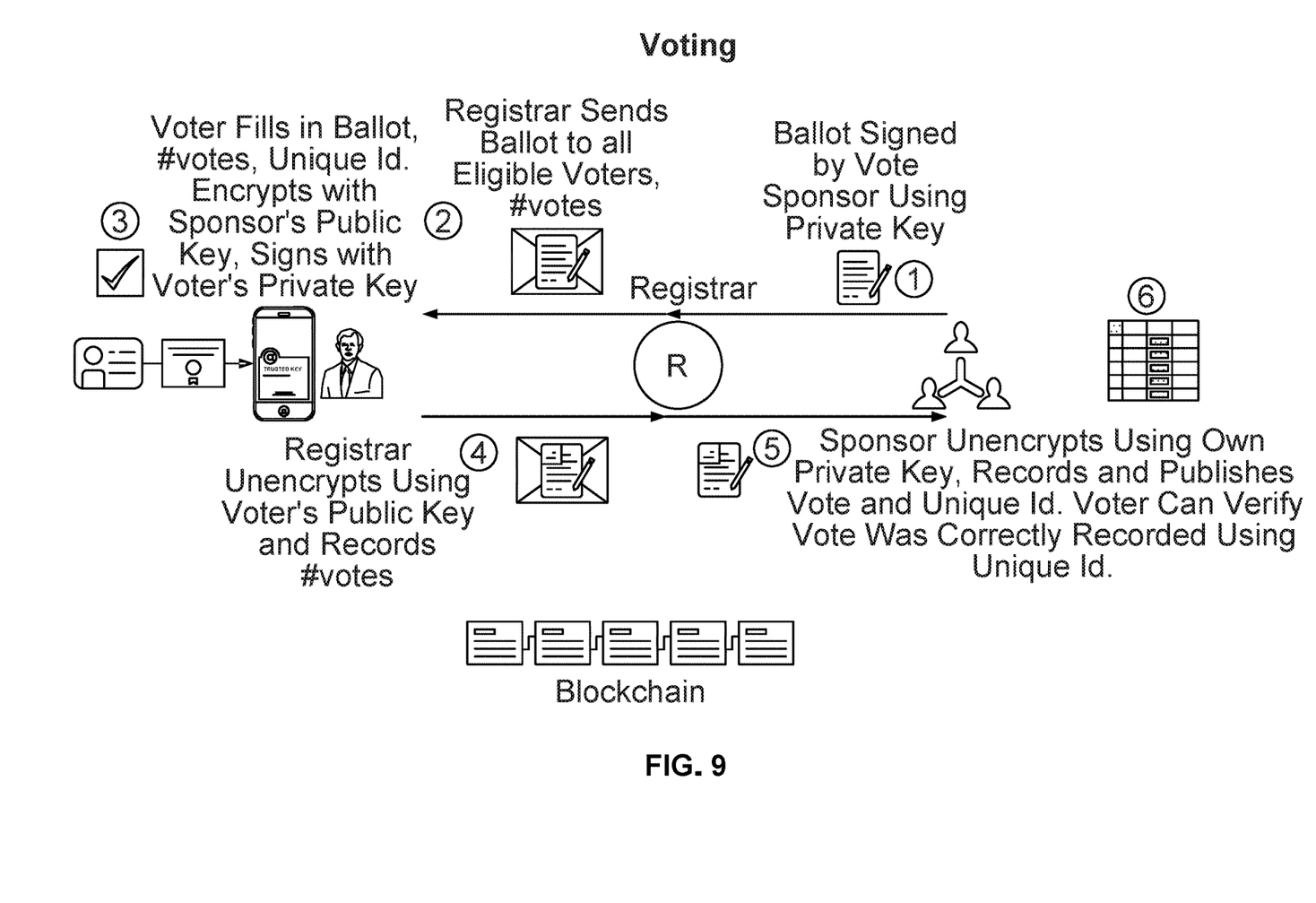
FIG. 9 depicts a method of one embodiment to support a workflow for a predetermined transaction type of voting.

FIG. 9 depicts a method of one embodiment to support a workflow for a voting system.

Scenario 6. Voting

Voting is a crucial building block for democracy and social governance. It is used to elect officials to various government positions as well as get direct voter input in referenda, used by corporations to seek approval for decisions from shareholders and even used in HOA (home-owners' associations), student bodies etc., Despite its widespread prevalence, voting is a particularly difficult scenario to digitize—despite significant advances in digital technology, most voting still takes place offline (whether in person or over mail). There are multiple reasons for this:

1. A lack of a way to strongly identify a voter to make sure they are who they claim they are and verify that they are eligible to vote
2. The tension between the need to preserve the privacy of a user's vote and need for transparency and verifiability (the ability to verify that a user's vote was registered correctly)
3. Overall security fears around the integrity of the process and the results The DIM Verified ID system described earlier can be used to address issue #1 using an Identity Token to represent the voter registration information with the voter's Credentials. We describe below a way to design an electronic election system that addresses #2 and #3. The basic outline of the system as follows:

A Sponsoring Entity is the election sponsor, whether it is an election commission, an HOA or a Corporation (for a shareholder's vote). The Sponsoring Entity prepares the ballot and actually counts the votes.

The election Registrar is the entity entrusted to conduct the election. In particular, the registrar is the one with the information about who the registered voters are and how many votes each voter is entitled to (e.g. in the case of a shareholder's vote, a voter is typically eligible to as many votes as the number of shares they own).

Voters each have a set of Credentials and an associated Identity Token that establishes their eligibility to vote.

The process of an election can then be structured as follows:

1. The Sponsoring Entity prepares a ballot, digitally signs it with their Private Key and passes it to the Registrar.
2. The Registrar receives the ballot and verifies it is from the Sponsoring Entity by checking the signature. The Registrar looks up its database for the list of eligible voters for this election and electronically forwards the ballot to each such voter, along with the corresponding indication of the number of votes they are entitled to.

3. Voters, upon receiving the ballot from the Registrar, take the following steps:
   a. Fill in the ballot according to their preferences
   b. Generate a random identifier that is known only to the voter and append this to the filled-in ballot
   c. Encrypt the ballot and random identifier with the Sponsor's Public Key so only the Sponsor can unencrypt and read their vote. In particular, this ensures the Registrar would not know the details of how the Voter voted.
   d. The voter then returns this entire package to the Registrar, signed with the Private Key of their Credentials, along with an Identity Token attesting to their verified identity.

4. The Registrar receives the completed ballot from the voter and takes the following steps:
   a. Verifies that the ballot is signed by the voter with the proper Credentials associated with the voter's verified id Identity Token.
   b. Notes down the number of votes in order to tally the total number of votes received. This tally can be matched against the Sponsor's tally to ensure the Registrar and Sponsor saw the same number of votes.
   c. Forwards the still-encrypted ballot to the Sponsor. Since the ballot itself has no information identifying the voter, the Sponsor is not able to tie specific votes to specific voters.

5. The Sponsor, upon receiving the encrypted completed ballots from the Registrar, takes the following steps:
   a. Unencrypts each ballot with the Sponsor's Private Key
   b. Register the votes and adds them to its tally
   c. Also publish to a public database the ballot, # votes and the associated random identifier that came with the vote. The voter can use this information to verify their vote was properly recorded, but since no one other than the voter knows this secret code, their privacy is protected.

By separating the roles of the Sponsor and the Registrar, the design separates the voter identity verification from the specifics of counting the votes. It is still possible for the Registrar and Sponsor to collude in order to determine how each voter voted. To prevent such collusion, both the Registrar code as well as the Sponsor code are written as Blockchain contracts that are (1) open-source and can thus be examined to ensure they are behaving exactly as expected and (2) execute only under prescribed conditions (e.g. when a properly signed message is sent to the Blockchain contract)

This combination of using open-source Blockchain contracts that only run when cryptographically signed messages are received ensures the overall system meets the goals of security, privacy and transparency required in a voting solution.

Figure 10:
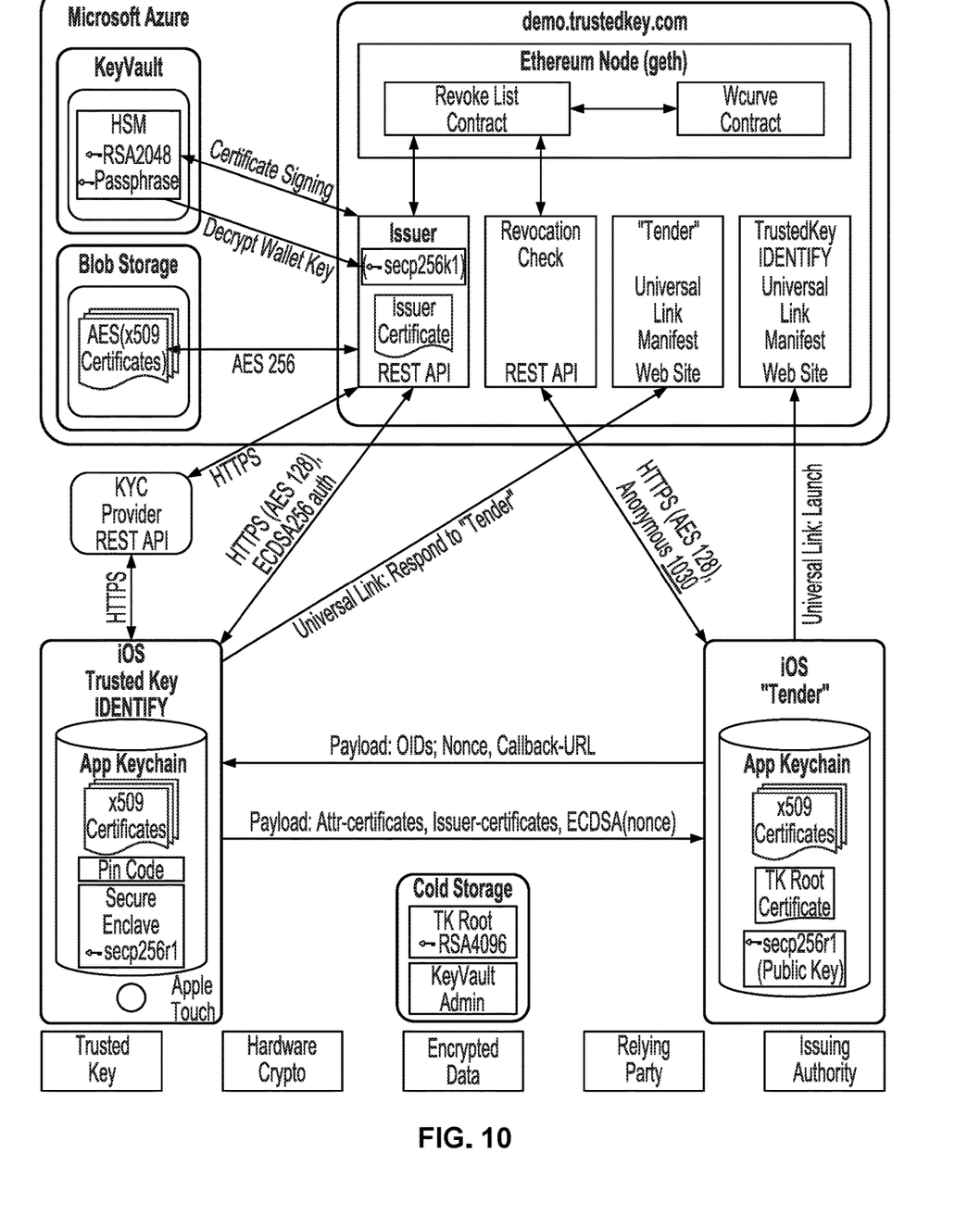
FIG. 10 depicts a plurality of components and solutions for a system for the previously described embodiments in the previously described figures in accordance with several embodiments.

FIG. 10 depicts a plurality of components and solutions for a system for the previously described embodiments in the previously described figures in accordance with several embodiments.

The implementation of the foundational Blockchain-based DIM system is distributed across:
Mobile Device
Cloud, and
Blockchain
The implementation includes functions for each of:
End-Users who download and provision a DIM app on their mobile device which creates and protects the user's Credentials
Identity Providers who are the Issuing Parties for Identity Tokens which reference the user's Credentials and are stored by the user in their DIMApp
Relying Parties who receive Identity Tokens and issue a cryptographic challenge-response to the user's DIM app to accomplish login, identity verification and other scenarios.

Individual scenarios are implemented across the DIM platforms as appropriate according to the details described earlier for each scenario.

In certain embodiments, the invention further provides machine readable storage devices for storing non-transitory machine-readable instructions for executing or carrying out the methods described herein. The machine-readable instructions can control all aspects of the Digital Identity Management system. Furthermore, the machine-readable instructions can be initially loaded into the memory module or accessed via the cloud or via the API.

Although specific embodiments and applications of the invention have been described in this specification, these embodiments and applications are exemplary only, and many variations are possible.

What is claimed:

1. A method for enabling a relying party device associated with a relying party to verify an identity of a user associated with a first device, the method comprising:
   generating, by a digital identity application on a first device associated with a user, a first set of credentials comprising a public-private key pair associated with the user, wherein the public-private key pair comprises a user public key and a user private key, and the user private key is restricted to the cryptographic processor on the first device;
   obtaining, by the first device associated with the user from an identity authority, an identity token wherein the identity authority possesses an identity authority signature key pair that comprises an identity authority public key and an identity authority private key, wherein the identity token comprises the user public key, and a unique identifier of the identity token, and the identity token securely attests to at least one of a verified legal identity, a government issued identity, or at least one identity attribute, wherein the identity token is signed with the identity authority private key, encrypted with the user public key, wherein the identity authority private key is registered with an internet certificate authority;
   requesting, by the first device associated with the user, access to a service associated with a relying party;
   receiving, at the first device from a relying party device, a cryptographic challenge to produce a validated identity; and
   in response to the cryptographic challenge to produce the validated identity, the first device performs the steps of:
      unlocking the digital identity application that stores the user private key;
      decrypting using the user private key the encrypted identity token; and providing the decrypted identity token from the first device associated with the user to the relying party device, wherein the relying party device verifies with the internet certificate authority that the decrypted identity token was issued by the identity authority.

2. The method of claim 1, wherein unlocking the digital identity application that stores the user private key comprises:

verifying at least one of a biometric or a PIN code by comparing the at least one of the biometric or the PIN code with at least one of a previously registered biometric or a previously registered PIN code that was previously registered for the user; and in response to determining that the at least one of the biometric or the PIN code matches the at least one of the previously registered biometric or the previously registered PIN code, making the user private key available for executing cryptographic operations.

3. The method of claim 2, wherein the cryptographic challenge includes or is derived from a pseudorandom value, and the result of the cryptographic operation is derived from or includes the pseudorandom value.

4. The method of claim 1, wherein the at least one identity attribute is selected from a photograph of the user, a video of the user, an information in the verified legal identity, and an information in the government issued identity.

5. The method of claim 1, further comprising:

embedding the identity token into an electronic document and cryptographically signing the electronic document with the user private key;

providing to the relying party the electronic document, wherein the relying party extracts the identity token from the electronic document and verifies that the user public key associated with the identity token corresponds to the user private key used to sign the electronic document.

6. The method of claim 1, further comprising:

signing a record using the user private key and providing the signed record to an alert database, wherein the relying party device receives a transaction request on behalf of a user associated with the signed record and provides to the first device the cryptographic challenge to produce the validated identity.

7. The method of claim 3, wherein in response to the cryptographic challenge to produce the validated identity, the method further comprises receiving an encrypted pseudorandom value that is derived from the pseudorandom value by encrypting the pseudorandom value with the user public key from the identity token.

8. The method of claim 7, wherein in response to the cryptographic challenge to produce the validated identity, the method further comprises decrypting the encrypted pseudorandom value, and the result of the at least one cryptographic operation performed on the cryptographic challenge comprises the pseudorandom value.

9. The method of claim 1, wherein the identity authority retains a copy of the identity token, and the at least one identity attribute of the identity token is unpublished on a blockchain.

10. The method of claim 1, wherein the digital identity application implements a blockchain contract that is written in a native programming language of a blockchain, that verifies a digital signature that is generated on the first device using the user private key, wherein the digital signature is created with the cryptographic processor of the first device without extracting the user private key from the first device, wherein the first set of credentials enable the user to sign at least one transaction on the blockchain.

11. The method of claim 2, wherein the cryptographic challenge is communicated to the first device by uniquely identifying the first device based on a 1-1 mapping from the user public key to the first device.

12. The method of claim 1, further comprising:

registering the user public key on a public blockchain, or registering the user public key on a permissioned blockchain.

13. The method of claim 1, further comprising:

registering a credential revocation list contract on a blockchain, wherein the credential revocation list contract enables the first set of credentials generated on the first device to be revoked by a second set of credentials generated on a second device.

14. The method of claim 13, wherein the credential revocation list contract comprises a revokee table that stores at least one public key from a revokee device and at least one public key of a corresponding authorized revoker device wherein if a registered authorized revoker device calls the credential revocation list contract to revoke credentials of a revokee device, a revocation transaction is digitally signed and recorded on the blockchain, and a revocation message is sent to a public key address of the revokee device.

15. The method of claim 1, further comprising:

registering an identity token revocation list contract with a blockchain, wherein the identity authority that issues the identity token sends a message to a user public key address to which the identity token was issued, to revoke the identity token, wherein the message sent by the identity authority comprises a token id of the identity token.

16. A system, comprising:

a processor configured to:

generate, by a digital identity application on a first device associated with a user, a first set of credentials comprising a public-private key pair associated with the user, wherein the public-private key pair comprises a user public key and a user private key, and the user private key is restricted to the cryptographic processor on the first device;

obtain, from an identity authority, an identity token wherein the identity authority possesses an identity authority signature key pair that comprises an identity authority public key and an identity authority private key, wherein the identity token comprises the user public key, and a unique identifier of the identity token, and the identity token securely attests to at least one of a verified legal identity, a government issued identity, or at least one identity attribute, wherein the identity token is signed with the identity authority private key, encrypted with the user public key, wherein the identity authority private key is registered with an internet certificate authority;

request, by the first device associated with the user, access to a service associated with a relying party;

receive, at the first device associated with the user from a relying party device, a cryptographic challenge to produce a validated identity; and in response to the cryptographic challenge to produce the validated identity, the processor of the first device is configured to:

unlock the digital identity application that stores the user private key;

decrypt using the user private key the encrypted identity token; and provide the decrypted identity token from the first device associated with the user to the relying party device, wherein the relying party device verifies with the internet certificate authority that the decrypted identity token was issued by the identity authority;

and;

a memory coupled to the processor and configured to provide the processor with instructions.

17. A computer program product, the computer program product being embodied in a non-transitory readable storage medium and comprising computer instructions for:

generating, by a digital identity application on a first device associated with a user, a first set of credentials comprising a public-private key pair associated with the user, wherein the public-private key pair comprises a user public key and a user private key, and the user private key is restricted to the cryptographic processor on the first device;

obtaining, by the first device from an identity authority, an identity token wherein the identity authority possesses an identity authority signature key pair that comprises an identity authority public key and an identity authority private key, wherein the identity token comprises the user public key, and a unique identifier of the identity token, and the identity token securely attests to at least one of a verified legal identity, a government issued identity, or at least one identity attribute, wherein the identity token is signed with the identity authority private key, encrypted with the user public key, wherein the identity authority private key is registered with an internet certificate authority;

requesting, by the first device associated with the user, access to a service associated with a relying party;

receiving from a relying party device a cryptographic challenge to produce a validated identity; and in response to the cryptographic challenge to produce the validated identity:

unlocking the digital identity application that stores the user private key;

decrypting using the user private key the encrypted identity token; and providing the decrypted identity token from the first device associated with the user to the relying party device, wherein the relying party device verifies with the internet certificate authority that the decrypted identity token was issued by the identity authority.

* * * * *

UNITED STATES PATENT AND TRADEMARK OFFICE
CERTIFICATE OF CORRECTION

PATENT NO. : 10,637,665 B1  
APPLICATION NO. : 15/662417  
DATED : April 28, 2020  
INVENTOR(S) : Sundaresan et al.

Page 1 of 1

It is certified that error appears in the above-identified patent and that said Letters Patent is hereby corrected as shown below:

On the Title Page

Item (12) "Sundaresan" should read -- Sundaresan, et al. --.

Item (72) Inventor is corrected to read:  
-- Prakash Sundaresan, Redmond, WA (US);  
Lionello G. Lunesu, Peng Chau, (HK);  
Antoine Cote, Sheung Wan, (HK) --.

Signed and Sealed this  
Eleventh Day of August, 2020

Andrei Iancu  
*Director of the United States Patent and Trademark Office*